United States Patent

[11] 3,567,907

| [72] | Inventor | Otis R. Carpenter |
| | | Barberton, Ohio |
| [21] | Appl. No. | 725,352 |
| [22] | Filed | Apr. 30, 1968 |
| [45] | Patented | Mar. 2, 1971 |
| [73] | Assignee | The Babcock & Wilcox Company |
| | | New York, N.Y. |

[54] APPARATUS FOR HEAT TREATING A PRESSURE VESSEL
10 Claims, 10 Drawing Figs.

| [52] | U.S. Cl. | 219/483, 219/492, 148/127 |
| [51] | Int. Cl. | C21d 1/30 |
| [50] | Field of Search | 148/127; 219/485, 483, 486, 487, 492 |

[56] References Cited
UNITED STATES PATENTS

| 1,902,146 | 3/1933 | Stresau | 148/127 |
| 2,133,926 | 10/1938 | Ransom, Jr. et al. | 148/127 |
| 2,451,518 | 10/1948 | Strickland, Jr. | 219/492 |

*Primary Examiner*—Bernard A. Gilheany
*Assistant Examiner*—F. E. Bell
*Attorney*—J. Maguire ABSTRACT: An arrangement of apparatus for heat treating a pressure vessel including a plurality of heat radiating heaters of the electrical resistance type mounted on the pressure vessel and electrically connected to a source of current, a plurality of thermocouples mounted on the pressure vessel for measuring the temperature of the vessel in the vicinity of each of the heaters, and an insulating material blanketing both the interior and exterior of the vessel. Means are provided for displaying the temperature of the vessel as measured by each of the thermocouples and the current to each of the heaters is adjusted in consideration of the measured temperatures to heat treat the vessel to a predetermined tensile strength. A plurality of timers are provided to adjust the current to the heaters, at least one electrical contact being associated with each timer and operable thereby. The contact of each timer acts as a switch in the electrical connection between the source of current and a particular heater. Each timer is preset to open and close the contact associated therewith for predetermined time intervals in consideration of the tensile strength of the pressure vessel adjacent the heater associated with that contact.

PATENTED MAR 2 1971

INVENTOR.
Otis R. Carpenter

BY

*J. Maguire*

ATTORNEY

APPARATUS FOR HEAT TREATING A PRESSURE VESSEL

BACKGROUND AND SUMMARY OF THE INVENTION

Pressure vessels assembled in the field are generally heat treated after assembly to relieve mechanical stresses developed in the course of their assembly and/or to impart desirable mechanical characteristics to the metal. Various techniques are available for heat treating. For example, the vessels may be mounted in an enclosure which is indirectly heated by circulating high temperature fluid or gas through the vessel. Alternately, the enclosure may be directly fired. In some instances the vessels are externally insulated to prevent rapid heat transfer outwardly of the metal and internally heated either directly or indirectly. The latter technique is usually resorted to when a furnace or enclosure is either not available or, if available, is not large enough to accommodate the pressure vessel.

An analysis of these techniques indicates that they are not adaptable to precisely controlling the temperature of different parts of the pressure vessels. The greatest thickness of the pressure vessel shell dictates the time period for heat treating the entire vessel. For example, as the pressure vessel is heated the thinner shell sections heat up more rapidly than the thicker sections. Consequently, the thinner sections are subjected to a soaking period while the thicker ones are still in the course of being brought up to the desired overall temperature. Assuming the entire vessel is raised to the same temperature, since tensile strength decreases with soaking time the thinner sections will have less tensile strength than their thicker counterparts. Accordingly, a more versatile heat treating technique is needed to control the overall tensile strength of pressure vessels.

The chemical, petroleum and power industries have in recent years called upon the suppliers of heavy industrial equipment to fabricate pressure vessels adaptable to highly corrosive and/or radioactive environments. In some instances, alloys having heat treatment response characteristics measurably different from prior art alloys have been specially developed. In others, heat treatment specifications have simply become more stringent. In any event, heat treating pressure vessels with greater precision has become a necessary adjunct to meeting the more exacting mechanical requirements. At times, parts or sections of modern pressure vessels are made of dissimilar metals, either by design or because the various subcomponents of the vessel are fabricated from steels poured from different heats of steel. When dissimilar metals are subjected to identical heat treatment cycles their mechanical properties are likely to be as dissimilar as their metallurgical chemistry; the ductility, yield strength and fatigue limits as well as tensile strength being affected by heat treatment. Accordingly, more precise methods of heat treating entire pressure vessels or various parts of the vessels are being sought by industry to produce vessels having mechanical properties approaching those theoretically obtainable, a task heretofore achieved only in the course of laboratory experiments.

Today, pressure vessels measuring up to 30 feet in diameter and 150 to 200 feet in length, and weighing in excess of 1,000 tons are being onsite assembled. During fabrication the subcomponents of these vessels are generally quenched and tempered to give them the tensile strength desired in the entire pressure vessel after assembly. When the subcomponents are welded to one another, the welds must be stress relieved to give them the same tensile strength as the subcomponents they join. A local heat treating technique is called for that is adaptable to precisely controlling the heat treatment of the weld while at the same time not adversely affecting the tensile strength of the subcomponents joined by the weld. In addition, it is desirable to provide portable apparatus adaptable to heat treating a wide variety of sizes and shapes of pressure vessel components.

It has been found that radiant heaters are adaptable to controlling temperature gradients to within plus or minus 10° F. if the effect of convection heating is substantially eliminated by mounting the heaters beneath an insulating blanket and further insulating the vessel from air currents, and that these heaters are ideally suited for locally heat treating pressure vessels. Further, the heaters are portable, independently operable and susceptible to being arranged for heat treating vessels of different dimensions.

The invention provides apparatus for heat treating a pressure vessel. The apparatus generally comprises a plurality of heat radiating heaters of the electrical resistance type mounted on the pressure vessel with provision for measuring the temperature of the vessel in the vicinity of each of the heaters, and with insulating material blanketing both the interior and exterior of the vessel. The measured temperatures are displayed and the current to each of the heaters adjusted in consideration of these temperatures to heat treat the vessel to a predetermined tensile strength. It is a feature of the invention that the temperature adjustment be automatically controlled by means of a plurality of timers, each having at least one electrical contact acting as a switch in the electrical connection between the source of current and a particular heater. The timers are preset to open and close the contact associated therewith for predetermined time intervals in consideration of the tensile strength of the pressure vessel adjacent the heater associated with the contact.

DESCRIPTION OF THE PREFERRED EMBODIMENT

Figure 1:
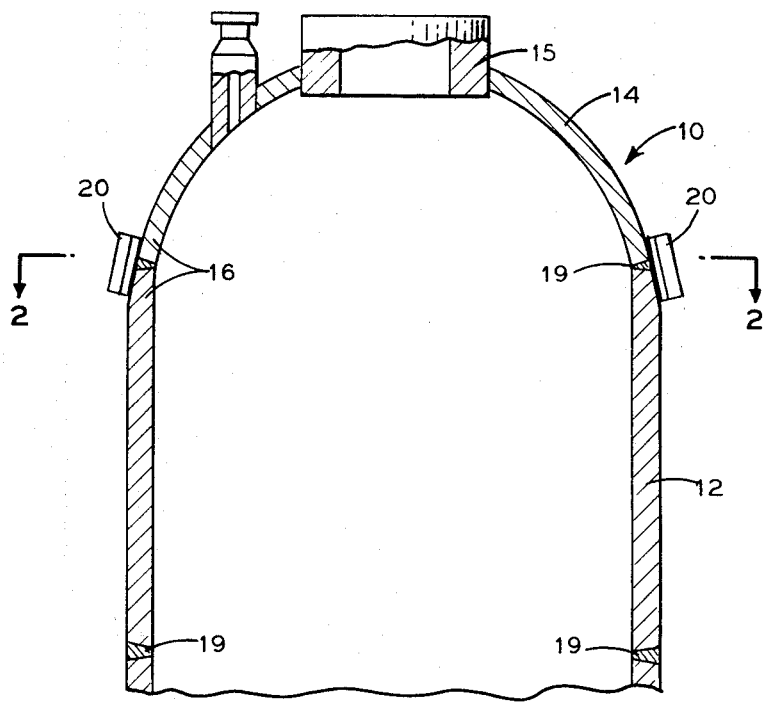
FIG. 1 is a fragmentary side elevation of an upright pressure vessel with heaters mounted thereon.

Referring now to the drawings wherein like reference characters designate like or corresponding parts throughout the several views there is shown in FIG. 1 a fragmentary portion of a pressure vessel 10 generally including a cylindrically-shaped shell 12 having an end closure 14 which is adapted to be connected via a nozzle 15 or plurality of nozzles to other equipment (not shown). The portion of the vessel not shown is substantially the mirror image of the portion shown. The vessel 10 is intended to be representative of pressure vessels such as chemical reactors, heat exchangers, boilers or nuclear reactors constructed of heat treatable metal and more particularly of one or more heat treatable and weldable metals forming subcomponents 16 for erecting the vessel. Although the inventive process and arrangement of apparatus hereinafter described may be used for heat treating vessel subcomponents 16 during the course of shop-fabricating the same, the invention is as also directed to heat treating a field-erected pressure vessel, the vessel having been shipped from the shop as a plurality of subcomponents for onsite assembly. The process and arrangement may be thus considered particularly adaptable to tempering and relieving pressure vessel stresses which develop during welding and/or machining operations performed on the vessel during onsite assembly. The term "heat treating" as used herein includes tempering and stress relieving welds and/or pressure vessel sections and reducing residual pressure vessel stresses to a minimum.

The vessel shown in FIG. 1 is a weldment of heat treatable steel subcomponents 16 fabricated from a steel or a plurality of steels which may, for example, be selected from the group consisting of ASTM A542, A543, A541 and/or ASTM A387. Each of these and other steels require heat treatment to impart desirable mechanical properties to the metals, the final heat treating step being an important phase of the fabricating process.

Figure 6:
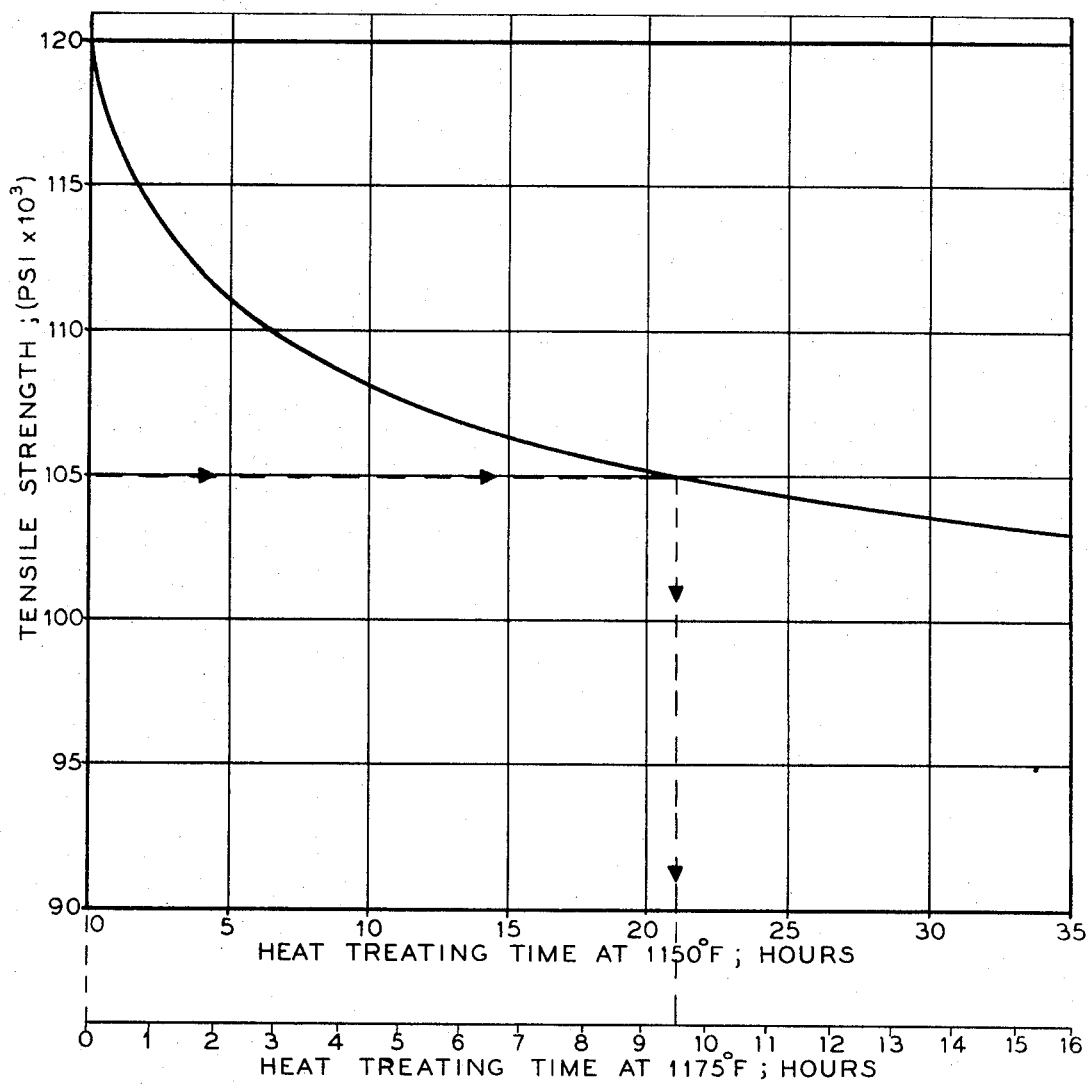
FIG. 6 is a graph of tensile strength vs heat treating time.

A typical tensile strength vs heating time curve, at a particular temperature, of a typical steel is shown in FIG. 6. As shown in this figure, when (for example) the steel is held at a soaking temperature of 1150° F. for a period of 21 hours it will have a tensile strength of 105K p.s.i. or 105,000 lbs./sq. inch. Alternatively, the same tensile strength can be obtained by holding the steel at a soaking temperature of 1175° F. for a period of approximately 9½ hours. Accordingly, either the temperature or soaking time period may be altered to produce the desired tensile strength in the metal undergoing heat treatment.

The need for controlling these parameters becomes more significant when it is appreciated that different subcomponents 16 of the pressure vessel 10 may have different cross-sectional dimensions. Since sections of thinner cross-sectional dimension heat up more quickly than those of thicker dimension, simultaneously heating both sections at the same soaking temperature will cause the sections to develop different tensile strengths. Further, the metallurgical makeup of the steels used in constructing the various subcomponetns 16 of the pressure vessel 10 may be different from component to component, either because the components originate from different melts of metal which may have varying percentages of carbon and/or alloying materials within a range specified for the particular steel, or because the various components are intentionally constructed of different steels. Since different steels exhibit different tensile strength vs heat treating time characteristics, at the same temperature, it is important to have a heat treating arrangement available which is sufficiently versatile to precisely control the heat treating time and/or temperature of the various sections or subcomponents of a pressure vessel, and in consideration of these differences regulate or control the overall final tensile strength of the pressure vessel. Still further, if various subcomponents are heat treated individually before assembly, a local heat treating arrangement is needed to adjust the tensile strength of the weld which joins the subcomponents together without adversely affecting the tensile strength of the subcomponents joined. For the sake of simplicity, the inventive method and arrangement of apparatus for controlling the time-temperature characteristic during heat treating is hereinafter described in relation to the latter application, e.g., locally heat treating a plurality of weld seams 19 in a pressure vessel 10 assembled in the field from subcomponents 16 already heat treated to a desired tensile strength.

Figure 2:
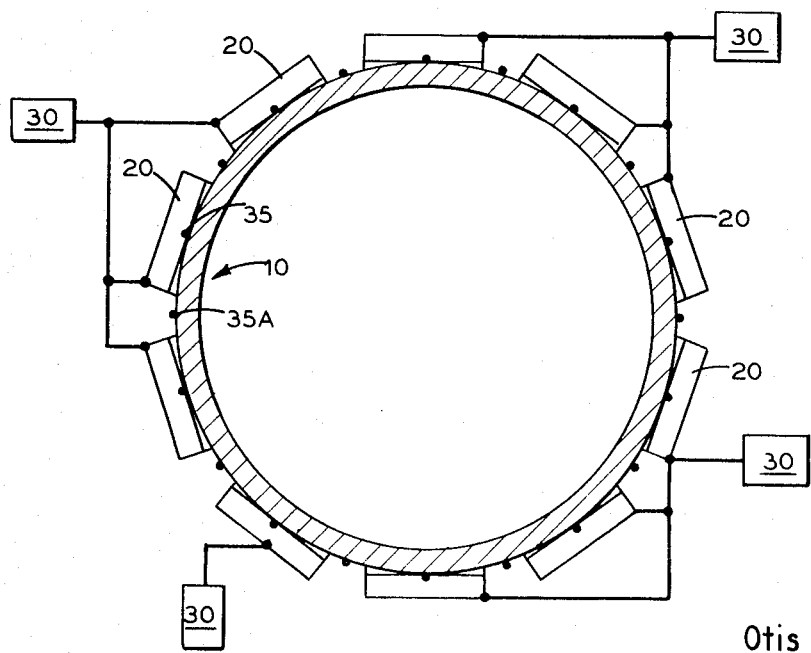
FIG. 2 is a top plan view of the vessel shown in FIG. 1, taken substantially along the line 2–2 of FIG. 1, showing a typical heater mounting arrangement according to the invention.
Figure 3:
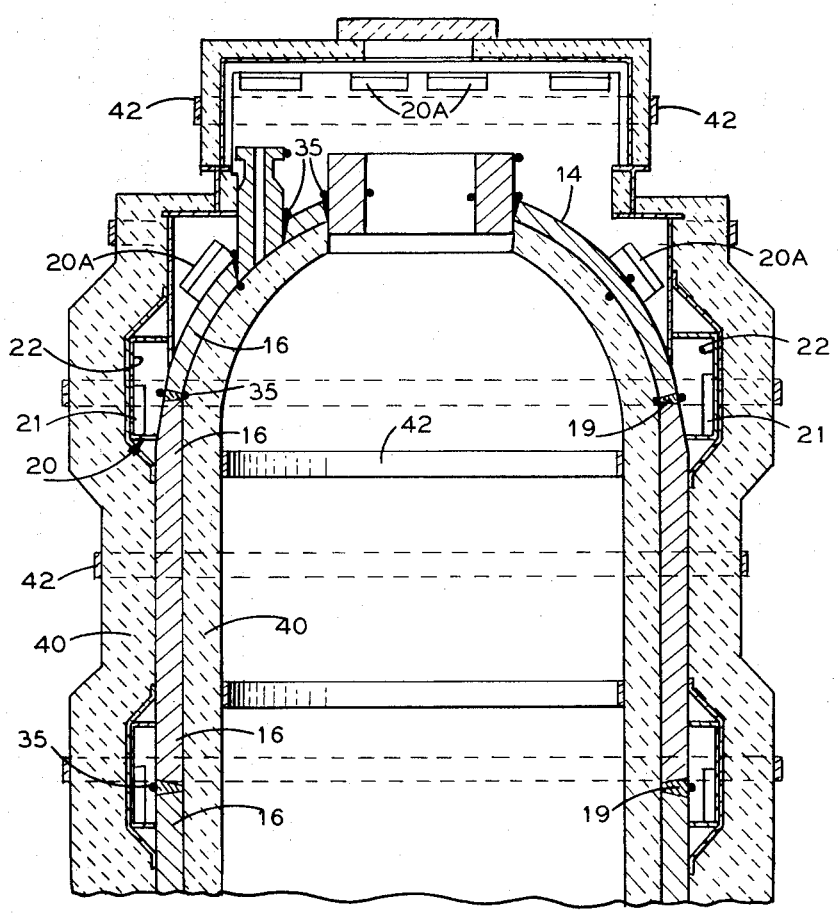
FIG. 3 is a fragmentary side elevation of a pressure vessel prepared for heat treatment showing the heaters and insulation in place.

As shown in FIGS. 2 and 3, the invention comprises an arrangement of portable radiant heaters 20 adapted to be mounted on the pressure vessel 10 for radiantly heating a weld seam 19 which joins one subcomponent 16 of the pressure vessel to at least one other component 16 of the vessel. Each of the heaters 20 in the vicinity of a weld includes a plurality of heating elements 21 carried by a mounting bracket or strap 22 which offsets the heating elements 21 from the pressure vessel shell 12, typically, a distance of from 2 to 8 inches. The heating elements 21 are well known in the art and preferably comprise an electrical resistance coil of nichrome metal adapted to be connected to a source of current or power source 30, a ceramic covering for the coil, and a U-shaped channel for mounting the coil on the bracket 22. Preferably, the coil covering consists of a plurality of ceramic beads which act as an electrical insulator for the coil while at the same time dissipating heat from the coil into the area defined by the bracket 22 and the portion of the pressure vessel shell adjacent the bracket. the heaters are distributed about the outer circumference of the pressure vessel along each of the circumferentially extending weld seams and are preferably equidistantly spaced apart from one another for uniformly heat treating the weld seams. Other heaters 20A (shown in reduced size) are arranged about the closure 14 at the upper end of the vessel in the vicinity of the weld seams connecting the nozzles 15 to the closure.

A plurality of thermocouples 35 are provided to sense the temperature of the weld seams 19 during the heat treating process. Advantageously, as shown in FIG. 2, one thermocouple 35 is mounted directly beneath each of the heaters 20 at a point on the weld seam covered by the heater, and another 35A is mounted intermediate each of the heaters. In addition to these thermocouples, accurate temperature control has been greatly facilitated by mounting a plurality of thermocouples on the weld seams inside the vessel as shown in FIG. 3.

After mounting the thermocouples and heaters, both the inside and outside of the vessel are sheathed with insulating material 40. In prior art heat treating arrangements the inside of the pressure vessel has not been insulated, with the result that the upper portion of the vessel becomes overheated. When gaseous or liquid fluids are used as the heat transfer medium and allowed to freely circulate within the vessel during the heat treatment process, heat from the lower portions of the vessel is convectively transferred to the upper portion. As a result, the tensile strength of the vessel varies drastically from its lower to upper portions. Without internal as well as external insulation, temperature gradients in excess of 100° F. to 200° F. have been encountered. With internal and external insulation, and the heater-thermocouple arrangement hereinbefore disclosed, the temperature gradient between lower and upper ends of a vessel has been held to less than plus or minus 10° F.

The insulating material 40, in the form of a blanket or plurality of overlapping blankets, is preferably held in place by steel straps 42. In practice, a plurality of reusable high temperature fiber blankets made of Kaowool enclosed in a wire mesh have been successfully employed. The term Kaowool is a registered mark of The Babcock & Wilcox Company. Slots or holes (not shown) are provided for the heater and thermocouple leads to protrude through the blanketing. Since the blanketing is subjected to high temperatures and is squeezed between the straps and pressure vessel as the vessel expands, it should be free of phenolic binders and sufficiently compressible to allow for differential thermal expansion of the vessel. Using 6 to 8 inch thicknesses of Kaowool blanketing on both the inside and outside of the vessel is sufficient to prevent heat dissipation from exceeding approximately 50° F. per hour.

Figure 5:
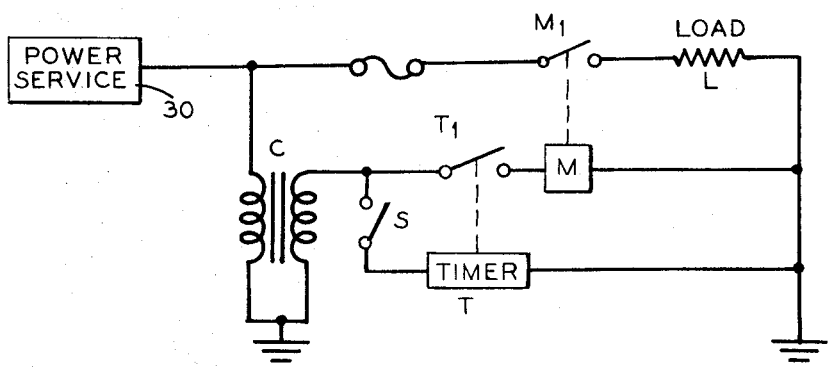
FIG. 5 is a schematic diagram of a control circuit for the heaters.

In the preferred embodiment the heaters are operated to heat treat various parts of the vessel in consideration of their differences as hereinbefore set forth. To vary the length of time any given heater operates and to continuously monitor the temperature of the vessel the control circuit shown in FIG. 5 is provided. As shown in FIGS. 2 and 5 the heaters are preferably connected to a three phase source of power such that at least one heater is connected to each phase of the power source 30. When an even number of heaters are being operated, a dummy load (not shown) may be automatically connected into the circuit by means well known in the art to balance the load on the supply. As shown in FIG. 5 each phase of the three phase supply is connected in series through a fuse and electrical contact $M_1$, to a heater load L and then to ground to energize the load L. A step down control transformer C having a primary winding in shunt with the supply has a secondary winding connected to first and second series circuits in parallel with one another. The first series circuit comprises a connection from the secondary winding through an electrical contact $T_1$ to the coil of a magnetic switch M and then to ground to energize the coil of the switch M. The second series circuit comprises a connection from the secondary winding through a switch S to a timer T and then to ground to energize the timer T. The magnetic switch M operates the contact $M_1$ transformer series with the load L when the electrical contact $T_1$ is closed since one side of the switch M is connected in series to the secondary of the transformer via the contact $T_1$ and the other side is connected to ground. The timer T intermittently operates the contact $T_1$. When the switch S is closed one side of the timer T is connected in series to the secondary via the switch S and the other side connected to ground. The timer T is preferably a motorized timer of the type which has provision for closing and/or opening its contact $T_1$ for a presettable time interval, preferably any predetermined percentage of a 60 second time interval. For operation, switch S is closed, energizing the timer T, which closes contact $T_1$ for a preset percentage of the 60 second time interval. Closing $T_1$ energizes the magnetic switch M for substantially the same predetermined time interval, which closes contact $M_1$ for substantially the same time interval. Closing $M_1$ energizes the heater load L, again, for substantially the same predetermined time interval. At the end of the time interval, contact $T_1$ opens causing the coil M to be energized. Thereupon contact $M_1$ opens and the load L is deenergized. The load is thus energized for a given percentage of the 60 second time interval and deenergized for the remainder of the time interval. As long as switch S remains closed the timing motor of the timer T runs continuously and the load is alternately energized and deenergized. Thus at the end of the 60 second time interval, contact $T_1$ is again closed for the preset time interval as hereinbefore indicated, causing the load to be energized, and so on, until the timer is preset to another time interval. If necessary, at any time in the course of the heat treatment process the switch S may be opened, causing the timer T to be deenergized and thus the load L to be deenergized. The step down control transformer C is preferably a three-phase transformer having three primary and second windings, a circuit as hereinbefore described being connected to each of the secondary windings. Any number of heater loads may be connected to the power supply via a series circuit including a contact $M_1$ and a fuse, each added series circuit being in parallel with one of its counterparts hereinbefore described or with a dummy load. The added loads, in groups of three are controlled by a like number of three phase transformers, each phase having associated therewith circuitry as hereinbefore described and being associated with a phase of the power supply to control the power to the additional loads. It is understood, of course, that all of the ground connections may be replaced by connections to the neutral point of the power supply, if desired, without departing from the spirit and scope of the invention.

The thermocouples 35 are preferably connected to a recorder (not shown) or a like means well known in the art which is responsive to changes in temperature of the individual thermocouples and visually displays the conditions sensed thereby to provide a source of information for presetting the timers. In practice, the predetermined time interval is set on the basis of knowing the time-temperature characteristic of the particular metal being heat treated and its initial tensile strength and the actual temperature at any of the various heaters as sensed by the thermocouples and displayed by the means responsive thereto. Such characteristic curves are available in the literature. Consequently, different parts of the vessel may be heated for whatever time interval is necessary in order to heat treat the entire vessel to meet the demands required by a particular tensile strength specification. It should be appreciated that with the foregoing arrangement the average temperature in the vicinity of a particular heater may be controlled very closely by operating a heater for a greater or lesser percentage of each 60 second time interval. Accordingly, both the temperature of a particular part of the vessel may be controlled as well as the time period which the temperature is maintained.

Figure 4:
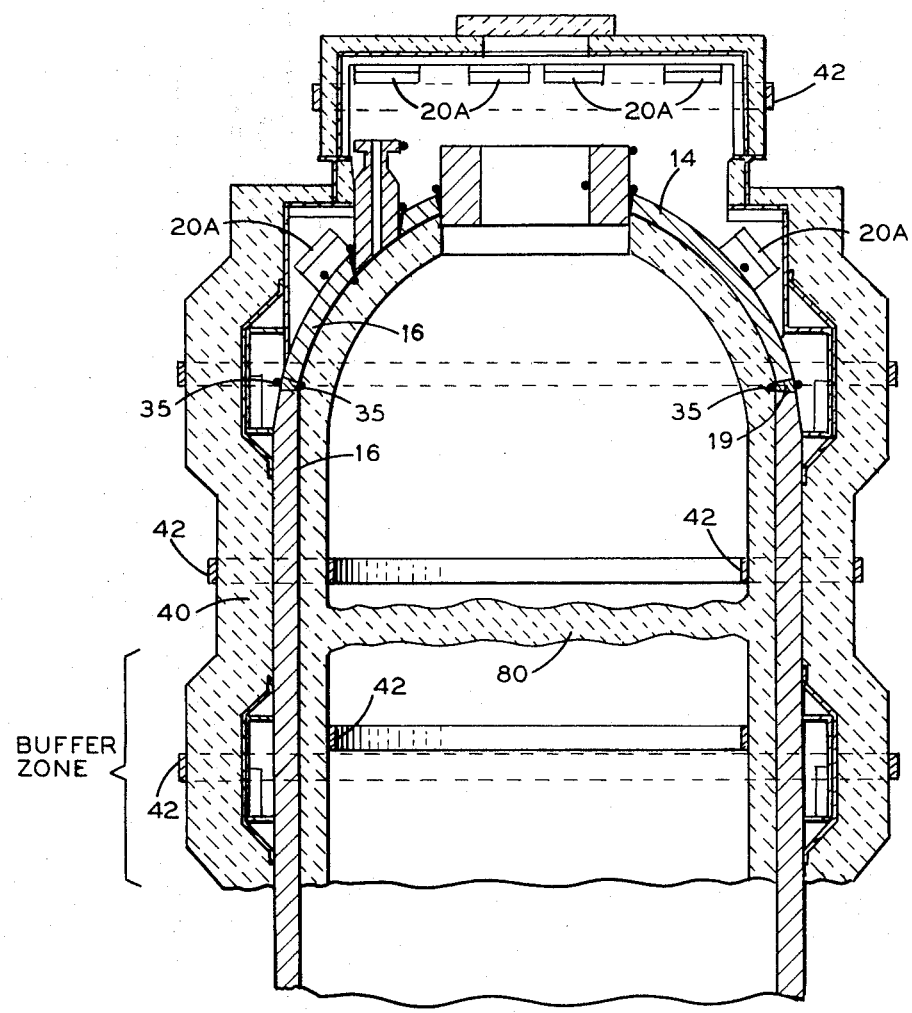
FIG. 4 is a fragmentary side elevation of a pressure vessel with a portion thereof prepared for heat treatment. The heaters and insulation are shown enlarged.

Occasionally it becomes necessary to heat treat a portion of a pressure vessel. In these instances heat transfer by convection and conduction to the rest of the vessel must be minimized. To accomplish this purpose a buffer heater arrangement as shown in FIG. 4 may be installed at the lower most portion of the vessel. The heaters are installed at the buffer zone in substantially the same manner as they are installed at the weld seams. The buffered area is heated and held to a temperature of from approximately 100° F. to 300° F. below the temperature employed in heating the portion being treated. In addition, the insulation is extended over the buffer zone and downwardly approximately 4 feet therebelow and a baffle 80 mounted transversely within the vessel to separate the area being heat treated from the remainder of the vessel. The transverse baffle is preferably constructed of Kaowool blanketing and is extended downwardly on the interior surface of the shell over the buffered area the same distance as the blanketing is so extended externally of the vessel. The heater control and thermocouple visual display arrangement hereinbefore described is employed to regulate the temperature of the buffer zone as well as the area of the vessel being heat treated.

I claim:

1. Apparatus for heat treating a pressure vessel, comprising plurality of heat radiating heaters of the electrical resistance type mounted on the pressure vessel and electrically connected to a source of current, a plurality of thermocouples mounted on the pressure vessel for measuring the temperature of the vessel in the vicinity of each of the heaters, insulating material blanketing both the interior and exterior of the vessel, means for displaying the measured temperatures, and means for adjusting the current to each of the heaters in consideration of the measured temperatures to heat treat the vessel to a predetermined tensile strength.

2. Apparatus according to claim 1 wherein the insulating material is compressible.

3. Apparatus according to claim 1 wherein at least one thermocouple is associated with each of the heaters and is mounted at a point on the vessel heated by the heater with which it is associated.

4. Apparatus according to claim 1 wherein the heaters are mounted adjacent a weld seam connecting one subcomponent of the pressure vessel to another subcomponent thereof.

5. Apparatus according to claim 1 wherein the insulating material is reusable.

6. Apparatus according to claim 1 wherein the insulating material is strapped to the pressure vessel so as to allow for expansion of the vessel.

7. Apparatus according to claim 1 wherein the insulating material is Kaowool blanketing.

8. Apparatus according to claim 1 wherein the adjusting means comprises an electrical circuit for supplying the current to the heaters, and a presetable timing means for interrupting the supply of current to some of the heaters while maintaining the current supply to other heaters.

9. Apparatus according to claim 1 wherein the adjusting means comprises a plurality of timers, at least one contact associated with each timer and operable by the timer with which it is associated, said contact of each timer acting as a switch in the electrical connection between the source of current and a particular heater, and each timer preset to open and close the contact associated therewith for predetermined intervals in consideration of the tensile strength of the pressure vessel adjacent the heater associated with that contact.

10. Apparatus according to claim 1 wherein the source of current is a three-phase power supply having at least one heater connected to each phase thereof, an electrical contact in series with each phase of the supply, and means intermittently opening and closing the contacts for predetermined time intervals.